United States Patent [19]

Gradl et al.

[11] Patent Number: 4,556,548
[45] Date of Patent: Dec. 3, 1985

[54] PROCESS FOR PURIFYING WET-PROCESSED PHOSPHORIC ACID

[75] Inventors: Reinhard Gradl, Hürth; Hilmar Roszinski, Erftstadt, both of Fed. Rep. of Germany

[73] Assignee: Hoechst Aktiengesellschaft, Fed. Rep. of Germany

[21] Appl. No.: 557,349

[22] Filed: Dec. 1, 1983

[30] Foreign Application Priority Data

Dec. 15, 1982 [DE] Fed. Rep. of Germany ....... 3246416

[51] Int. Cl.$^4$ ...................... C01B 25/16; C01B 15/16; C01B 25/26; C01F 1/00
[52] U.S. Cl. ................................ 423/321 S; 423/167; 423/313; 423/322
[58] Field of Search ................ 423/321 R, 321 S, 322, 423/313, 167

[56] References Cited

U.S. PATENT DOCUMENTS

| | | | |
|---|---|---|---|
| 1,929,442 | 10/1933 | Milligan | 423/321 S |
| 3,531,250 | 9/1970 | Hinz et al. | 423/167 |
| 3,684,438 | 8/1972 | Gleason | 423/321 S |
| 4,118,462 | 10/1978 | Desire et al. | 423/321 S |
| 4,196,180 | 4/1980 | Wojtech et al. | 423/321 R |

FOREIGN PATENT DOCUMENTS

| | | |
|---|---|---|
| 3127900 | 3/1983 | Fed. Rep. of Germany ... 423/321 S |
| 1436113 | 5/1976 | United Kingdom . |
| 1436114 | 5/1976 | United Kingdom . |
| 1436115 | 5/1976 | United Kingdom . |

*Primary Examiner*—Gregory A. Heller
*Attorney, Agent, or Firm*—Connolly and Hutz

[57] ABSTRACT

The disclosure relates to a process for purifying crude, concentrated wet-processed phosphoric acid. To this end, the disclosure provides:

(a) for the organic solvent to be mixed with the starting product in a ratio by volume of more than 4:1 to effect in a single process step the extraction—from the crude wet-processed phosphoric acid—of a quantity of phosphoric acid necessary for 40 to 70 weight % of the $P_2O_5$ used to go into the organic phase, and for the resulting aqueous phosphoric acid raffinate to contain at most 28–32 weight % $P_2O_5$, and for the organic phosphoric acid solution to be separated from the phosphoric acid raffinate;

(b) for the separated organic phosphoric acid solution to be scrubbed with a quantity of scrubbing solution corresponding at most to 5% of the volume of the phosphoric acid solution; for the scrubbing solution to be recycled into stage (a), and for purified phosphoric acid and phosphate salt solution, respectively, to be recovered in known manner from the scrubbed phosphoric acid solution;

(c) for the aqueous phosphoric acid raffinate produced in stage (a) to be neutralized, if desired, after prior removal of residual solvent, for it to be subjected to treatment with an alkaline agent with the resultant formation of a purified phosphate salt solution and precipitation of a so-called neutralization sludge, and (d) for said neutralization sludge and simultaneously obtained alkali metal phosphate solution to be separated from each other, for the sludge to be mixed with finely ground phosphate ore, and for the mixture to be made into phosphate pellets for use in electrothermal phosphorus production.

5 Claims, No Drawings

PROCESS FOR PURIFYING WET-PROCESSED PHOSPHORIC ACID

The present invention relates to a process for purifying wet-processed phosphoric acid.

Phosphoric acid is obtainable by two basically different commercial routes. Thus, it is possible for phosphoric acid to be made from crude phosphates by wet or thermal processing treatment. In the thermal process, crude phosphate is subjected at high temperature in an electric resistance furnace to processing treatment with quartz gravel and coke, the resulting phosphorus becoming burnt to $P_4O_{10}$ which is hydrolyzed to give phosphoric acid. This process yields very pure phosphoric acid whose salts have food quality.

The so-called wet process provides for the crude phosphate to be processed with a mineral acid selected from hydrochloric acid, nitric acid and sulfuric acid, which is preferred. In this latter case, anhydrous calcium sulfate, semihydrate or dihydrate and crude phosphoric acid are obtained as reaction products depending on the temperature and concentration conditions selected. In the wet-process, more or less heavily contaminated acids are obtained in accordance with the particular crude feed phosphate. Unless used for making fertilizers, it is necessary for this acid to be purified for use in the production of commercial phosphates. Two processing principles find commercial use, namely the purification by precipitation of contaminants and purification by extraction which provides for the phosphoric acid to be extracted by means of an organic solvent.

As a result of the steadily increasing prices for electric energy and coke and hence of the increasing production costs of thermal phosphoric acid, the wet process and purification methods used in connection therewith which involve considerably less expenditure of energy are to an increasing extent gaining interest.

On the other hand, the thermal process has a beneficial effect, namely to permit direct use to be made of crude phosphate, even of phosphate containing considerable proportions of $SiO_2$ or relatively large proportions of organic contaminants. Contaminants originally present in the crude phosphate are ultimately removed in oxide or silicate form together with furnace slag and are reasonaly easy to deposit.

In the interim, crude phosphate is to an increasing extent already wet-processed by the phosphate exporting countries, and crude phosphoric acids are indeed commercially available worldwide. Precipitation methods comprising several stages which are carried out prior to or while neutralizing the phosphoric acid, have long been described.

In the precipitation purification which is commonly less expensive than the thermal process, the feed material preferably is dilute phosphoric acid obtained e.g. by dihydrate-processing treatment. After precipitation of the sulfate ions by means of Ca or Ba-chemicals, the bulk of heavy metals, such as As, Cu and Pb, are precipitated by means of a $Na_2S$-solution, remaining cationic contaminants (Fe, Al, Mg, Ca) being subsequently separated in one or two stages by neutralization with NaOH or $Na_2CO_3$.

Adverse effects of this process reside in the expensive deposition of the neutralization sludge and conversion of the phosphoric acid into a phorphate salt solution which finds limited uses only.

Processes which provide for wet-processed phosphoric acid to be purified by extracting it with an organic solvent are gaining increasing interest.

More particularly, the crude acid, commonly prepurified crude acid, is countercurrently contacted in several stages with the solvent, the resulting crude extract is freed from minor proportions of ionic compounds by scrubbing it with water, $H_3PO_4$ or a salt solution, and phosphoric acid is ultimately recovered from the pure extract by re-extraction with water or alkaline liquor, or by distillative removal of the solvent.

In this process, it is possible for very pure acid to be obtained in very good yield. To this end, it is however necessary for the extraction and scrubbing treatment to be effected in a plurality of processing stages. In addition to this, the work-up of the residues containing the contaminants and their deposition is as problematic as in the precipitation purification.

Processes known in the art as "splitting process" have been described e.g. in German Patent Specification DE-AS 23 20 877 which provide for just a certain portion of crude $P_2O_5$ to be extracted and recovered in the form of purified phosphoric acid, and for the balance to remain in the raffinate phase. Concerned is more particularly raffinate acid which can only be used for making fertilizers. Needless to say, certain contaminants, especially ecologically critical heavy metals, may become concentrated in those fertilizers which is not desirable.

Several of the processes described hereinabove are simultaneously or alternatively commercialized in many phosphoric acid production facilities for reasons of keeping pace with technological developments and responding more flexibly to price fluctuations and availability of energy and raw materials.

The present invention now provides an improved process for purifying crude wet-processed phosphoric acid containing more than 45 weight % $P_2O_5$ by contacting the starting product with an organic solvent being immiscible or only partially miscible with water and capable of dissolving phosphoric acid so that merely a portion of the $P_2O_5$ contained in the starting product is adsorbed by the solvent and an aqueous phosphoric acid raffinate containing less $P_2O_5$ than the starting product is formed; subsequently separating the formed organic phosphoric acid solution from the phosphoric acid raffinate and scrubbing said solution; recycling scrubbing solution into the process; recovering purified phosphoric acid or phosphate salt solution (alkali metal or ammonium phosphate) from the scrubbed organic phosphoric acid solution, and utilizing otherwise remaining phosphoric acid raffinate. As has unexpectedly been found, the process just described can be critically improved technically and commercially by the following operations comprising:

(a) mixing the organic solvent with the starting product in a ratio by volume of more than 4:1, preferably 6:1 to 10:1, and thereby effecting in a single process step the extraction—from the crude wet-processed phosphoric acid—of a quantity of phosphoric acid necessary for 40 to 70 weight %, preferably 50 to 55 weight %, of the $P_2O_5$ used to go into the organic phase, and for the resulting aqueous phosphoric acid raffinate to contain at most 28–32 weight %, preferably 30–32 weight %, $P_2O_5$, and separating the organic phosphoric acid solution from the phosphoric acid raffinate;

(b) scrubbing the separated organic phosphoric acid solution with a quantity of scrubbing solution corresponding at most to 5%, preferably 3.3 to 2%, of the volume of the phosphoric acid solution; recycling the scrubbing solution into stage (a), and recovering in known manner purified phosphoric acid and phosphate salt solution, respectively, from the scrubbed phosphoric acid solution;

(c) neutralizing, if desired after prior removal of residual solvent, the aqueous phosphoric acid raffinate produced in stage (a) by subjecting it to treatment with an alkaline agent, preferably in one or two stages up to a pH of 9, with the resultant formation of a purified phosphate salt solution and precipitation of a so-called neutralization sludge, and (d) separating said neutralization sludge and alkali metal phosphate solution from one another, preferably by scrubbing; uniting the scrubbing filtrate with the alkali metal phosphate solution; mixing the sludge with finely ground phosphate ore, and converting the mixture into phosphate pellets for use in electrothermal phosphorus production.

As already mentioned, the starting product used in the process of this invention is commercially available crude phosphoric acid containing more than 45 weight % $P_2O_5$. In all those cases in which it is desirable to obtain very pure final products, it is good practice to subject this acid to pre-purifying treatment and thereby to free it from its principal contaminant, which is sulfuric acid, and organic contaminants.

To this end, the acid is treated in known manner with calcium ions in the presence of active carbon at about 80° C.; via the stage of intermediarily forming calcium sulfate semihydrate, pre-purified (commonly green colored) acid is obtained together with a filter cake which consists essentially of gypsum, is obtained in a quantity corresponding to 5–6 weight % of the crude acid, and can readily be disposed of.

Most of the crude acids are normally also contaminated with heavy metal ions, such as ions of cadmium, copper, lead and mercury, and also with arsenic ions. The uses the final products are put to, or problems relating to environmental protection or product deposition may make it imperative for these contaminants to be removed or to be specially deposited in concentrated form. In this event, the ions specified should conveniently be removed by the process described in German Patent Application P 32 27 202.2 which provides for them to be removed prior to extraction by a simple processing step from the optionally pre-purified acid by subjecting this latter to treatment with a diorganyldithiophosphoric acid ester and an adsorbent. Alternatively, it is also possible to carry out this step after extraction on the phosphoric acid raffinate.

A further process for obtaining pure phosphoric acid, deprived especially of $SO_4$-ions, has e.g. been described in U.S. Pat. No. 4,321,245, which provides for the sulfate ions to be removed by the addition of barium compounds and countercurrent extraction in several stages in the presence of sulfuric acid with the aid of organic solvents being immiscible or only partially miscible with water, and for the phosphoric acid to be recovered from the separated organic extract. The purifying treatment is effected in an extraction zone comprising n-stages, where n is equal to or more than 5; the barium compound is added to the phosphoric acid which is to be purified and the mixture is admitted near the head of the extraction zone. In addition to this, the organic solvent phase is dispersed in the aqueous phase and the sulfuric acid is caused to travel countercurrently to the phosphoric acid by introducing it into one of the stages ranging from stage 4 to stage n-1.

In the process of this invention, the organic solvent should preferably be cycled and used with that content of water which it has after recovery of the purified phosphoric acid or phosphate salt solution from the organic phosphoric acid solution. Amyl alcohol, preferably amyl alcohol which originates from an oxo-synthesis, should conveniently be used as the organic solvent.

The extraction yield (or splitting ratio) depends on the $P_2O_5$-concentration in the crude acid, the number of stages, the solvent/acid-ratio, and the quantity of recycled scrubbing water. In accordance with this invention, the acid concentration is at least 45 weight % $P_2O_5$ and the extraction is effected in just one stage. Critically determined by the solvent/acid-ratio selected is not only the extraction yield but also the $P_2O_5$-concentration in the organic and aqueous phases. In one case or other, it may be necessary to select a high $P_2O_5$-concentration for the extract and aqueous phase, i.e. to effect the extraction with the use of a small solvent/acid-ratio as described e.g. in German Patent Specification DE-PS 23 20 877. In this process, 64.6 to 70 weight % of the $P_2O_5$ is extracted and it is suggested that the extraction should be effected in more than 1 stage. In order to achieve high concentrations in a small number of stages, the solvent/acid-ratio is intentionally kept very low, namely at 1.2–1.4:1. The selection of a ratio greater than specified is said to have adverse effects, namely to require the use of large-dimensioned reactors.

The very poor selectivity of the solvent which is the result of the low solvent/acid-ratio selected indeed is a considerable adverse effect of this known process. This is the reason why a heavily contaminated extract is obtained. Based on $P_2O_5$, the organic extract contains just about 63 weight % less iron than the crude acid. It is therefore an imperative requirement for this extract to be scrubbed in several stages with a large quantity of purified phosphoric acid. The ratio of extract to scrubbing acid selected is between 2 and 4:1. In the event of the scrubbing acid used being pure acid coming from the re-extraction stage, it is necessary for 24–46 weight % of the resulting acid to be recycled. Needless to say this is a procedure which adversely effects a good deal of phosphoric acid already purified.

Despite this heavy operative expenditure, the resulting acid has a moderate degree of purity only.

In addition to this, an aqueous phase containing 40 to 47 weight % $P_2O_5$ is obtained during the extraction. Bearing in mind that concentrated crude phosphoric acids normally contain at least 50 weight % $P_2O_5$, while crude phosphoric acids made by the dihydrate process contain about 30 weight % $P_2O_5$, it is necessary for these aqueous residues to be diluted or concentrated for further use.

In accordance with this invention, it has been found advantageous to effect the extraction with the use of a high solvent/acid-ratio at the price of a low $P_2O_5$-concentration in the organic phase since the solvent's selectivity is in this way unexpectedly less heavily affected by cations. In this manner, it is possible for more than 90% of cationic contaminants (based e.g. on the iron content) to be deconcentrated from the crude acid to the organic extract.

Acid recoverable from such extract has a purity sufficient for certain uses. Where higher demands are being made as to the purity of the acid, it is possible for this extract to be scrubbed in 1 to 3 stages. To this end, it is sufficient to use a very small quantity of water corresponding to about 1/30 of the crude extract volume so that the resulting scrubbed raffinate, which can be recycled into the extraction stage, practically presents the same $P_2O_5$-concentration as the aqueous phase formed during the extraction. The re-extraction of phosphoric acid from the organic phase can be effected in known manner using water or an aqueous alkaline liquor, purified acid being obtained in the first case and an alkali metal phosphate solution in the second. The quantitative ratios of water or alkaline liquor to extract phase should be so selected that the entire phosphoric acid goes from the organic into the aqueous phase. Prior to putting the resulting purified acid and alkali metal phosphate solution, respectively, to the intended uses, the solvent dissolved therein should conveniently be removed therefrom, e.g. by stripping with steam, or recovered.

The raffinate acid coming in accordance with this invention from the extraction stage contains between 30 and 60%, preferably between 45 and 50%, of the crude $P_2O_5$ used, in a concentration of at least 28%, preferably 30 to 32% $P_2O_5$. This is exactly the concentration of $P_2O_5$ in that crude acid which is obtained on subjecting phosphate ore to processing treatment with sulfuric acid by the dihydrate process, and which finds use as starting product in standard precipitation purification methods.

If necessary, the aqueous phosphoric acid raffinate is first freed from residual solvent by stripping it with steam. Next, unless removed from the pre-purified crude acid, the cadmium, other heavy metal and also arsenic contaminants are removed from the aqueous phosphoric acid raffinate by subjecting it to treatment with certain thioesters.

Next, (under circumstances after the removal of heavy metal and arsenic ions) the aqueous phosphoric acid raffinate is neutralized by means of an aqueous alkaline solution whereby the contaminants are precipitated in the form of a neutralization sludge consisting of phosphates and/or hydroxides and a purified alkali metal phosphate solution is obtained which is distillatively separated from the sludge. This process is known in the art as the precipitation purification process described e.g. by Winnacker-Küchler in "Chemische Technologie" vol. 1, 3rd edition, Carl Hanser Verlag München 1970, page 358. Prior to neutralizing it, it is possible for the acid to be treated with a desulfatizing agent or reductant in order to free it as completely as possible from sulfate ions and vanadium ions by precipitation. The alkali metal solution which should preferably be used is sodium hydroxide solution or sodium carbonate. Depending on the purity targeted for the resulting alkali metal phosphate solution and its intended uses, it is possible for the alkali metal/P-ratio to be selected between 5/3 and 2. The neutralization may be effected in one or two stages. If effected in two, the neutralization sludge is isolated separately after the first stage and only filtrate is subjected to further neutralization, or filtration is omitted and the suspension further neutralized.

After appropriate establishment of the exact alkali metal/P-ratio, the purified phosphate solution can be made directly or after evaporation to a higher $P_2O_5$-concentration, into condensed alkali metal phosphate, e.g. pentasodium tripolyphosphate. If the precipitation purification of this invention were effected just for itself using crude phosphoric acid as the starting material, for example, it would be rendered a commercially unattractive procedure for the following reasons. Firstly, in the event of the precipitation purification being effected separately, the $P_2O_5$-yield would be as low as about 80%; secondly, the deposition of resulting neutralization sludge would be a problem. While it would be possible to remedy this by subjecting the neutralization sludge to treatment with sodium hydroxide solution and water glass as disclosed in German Patent DE-PS 20 35 505, the fact remains that this is a process which involves considerable technical expenditure.

In accordance with this invention, these adverse effects can be obviated by subjecting the neutralization sludges originating from the precipitation purification to processing treatment inside a phosphorus furnace. To this end, the neutralization sludges are admixed while moist with crude phosphate and made in known manner e.g. by the process described in German Patent DE-PS 12 58 847 into pellets which are subsequently calcined on a sinter grate and ultimately used in an electrothermal furnace. In this way, it is possible for residual $P_2O_5$ to be practically completely recovered from the neutralization sludge in the form of very pure elementary phosphorus or ferrophosphorus. The cationic contaminants originating from the filter sludges are removed together with phosphorus furnace slag or together with filter dust through a Cotrell electric precipitation means.

The recovery of $P_2O_5$ in a yield of practically 100% from commercial crude phosphoric acid containing at least 45% $P_2O_5$ by successively subjecting the crude acid to extraction, precipitation purification and ultimately electrothermal processing treatment is the goal targeted by the process of this invention. Based on 100 parts $P_2O_5$ used, about 50 parts are purified in the extraction stage and obtained in the form of orthophosphoric acid or alkali metal phosphate solution. A further 40 parts $P_2O_5$ are obtained in the neutralization stage in the form of an alkali metal phosphate solution presenting an alkali metal/P-ratio of 5/3 to 2:1, and a still further 10 parts are processed in the phosphorus furnace of which about 9 parts in the form of elementary phosphorus and 1 part in the form of ferrophosphorus.

The most important and critical advantages of this compound process reside in the following:

1. The individual processing steps are all carried out under optimum conditions.
   (a) Practically any commercially available crude acid can be used as starting material. The extraction is very easy to carry out technically. Just one stage is needed; incrustations are not liable to occur; yield-increasing chemicals (e.g. sulfuric acid) are omitted. As a result of the high selectivity, it is possible to limit the scrubbing treatment to 3 stages or even to omit it. The aqueous residues are used as feed material in the neutralization stage.
   (b) The raffinate acid coming from the extraction stage with about 30% $P_2O_5$ corresponds to acid coming from the dihydrate process. Neutralization and filtration until establishment of an alkali metal/P-ratio of 2:1 are processing steps very easy to carry out technically. The process is commercially attractive and yields products directly accessible to further processing treatment.
   (c) The neutralization sludges can be used as solid materials in the phosphorus furnace. Even those containing relatively high concentrations of contaminants can be processed. More especially, organic contaminants are completely destroyed.

2. The overall yield of $P_2O_5$ is practically 100%. Even the minor proportion of phosphorus coming from the phosphorus furnace in the form of ferrophosphorus is a commercial rather than a waste product.
3. There are practically no deposition problems. The aqueous raffinate phase coming from the extraction stage is feed material in the precipitation purification. The neutralization sludges from the precipitation purification are processed in the phosphorus furnace. The phosphorus furnace slag is reasonably easy to deposit or use is made thereof in building roads or dikes. The gypsum obtained during the prepurifying treatment is practically free from pollutants and is obtained in quantities which can practically be neglected. Only for the filter cake which may have been formed during the separation of arsenic, cadmium, and other heavy metals is it necessary to be delivered to a special deposition site at low cost as only very small quantities need be deposited.
4. Various products, namely phosphoric acid, alkali metal phosphate solutions and elementary phosphorus, which find widespread uses, are obtained.

The following Example illustrates the invention. Commercially available crude acid prepared from North-Africa phosphate, with the following composition (in weight %) was used in the following experiments:

| $P_2O_5$ | 50.3 | Fe | 0.27 | Cr | 0.011 |
|---|---|---|---|---|---|
| $SO_4$ | 2.6 | Al | 0.12 | As | 0.0008 |
| $C_{org}$ | 0.048 | Mg | 0.71 | V | 0.015 |
| F | 0.32 | Zn | 0.025 | Cd | 0.0011 |

10 kg of this acid was initially heated to about 80° C. and mixed successively with 0.3 kg active carbon and 2.14 kg calcium hydroxide. Next, the mixture was stirred for about 50 minutes and filtered off on a pressure filter. The filter cake was scrubbed with 10 l hot water and the scrubbed filtrate was combined with the primary filtrate. The resulting pre-purified acid was composed as follows (weight %):

| $P_2O_5$ | 47.6 | Fe | 0.26 | Cr | 0.010 |
|---|---|---|---|---|---|
| $SO_4$ | 0.43 | Al | 0.11 | As | 0.0007 |
| $C_{org}$ | 0.009 | Mg | 0.67 | V | 0.014 |
| F | 0.3 | Zn | 0.024 | Cd | 0.0010 |

1000 g of this pre-purified acid was heated to 70° C., admixed with 1.5 g bis(2-ethylhexyl)dithiophosphoric acid ester, and the whole was stirred for about 30 minutes. Next, the mixture was cooled to 35° C. and 10 g perlite was added. After stirring for a further 30 minutes, the mixture was filtered off. The phosphoric acid was free from thioester and contained less than 0.0001 weight % each of Cd and As.

In the experiments to follow, use was however made of the pre-purified acid containing cadmium and arsenic (for analysis see above).

In a mixer/settler-unit, 1666.3 g/h of this acid and 256.2 g/h recycled scrubbing raffinate previously admixed with 10 g barium carbonate through the acid feed line, were extracted simultaneously with the use of 5826.1 g/h water-saturated amyl alcohol; the aqueous phase was continuously cycled and the organic phase was dispersed therein. 6530 g/h organic extract which contained 7.34% $P_2O_5$ and 0.0033% iron, and 1218 g/h aqueous residue with the composition indicated below were obtained. The organic extract was scrubbed countercurrently with water in a volume ratio of 30:1 (organic/aqueous) in a three stage mixer/settler-unit and ultimately re-extracted with water in an extraction column provided with rotating structural parts, in a volume ratio of 6:1 (organic/aqueous). The resulting pure acid was concentrated up to a $P_2O_5$-content of about 60%.

The pure acid was composed as follows:

| $P_2O_5$ | 59.7 | Fe | 0.0001 | Cr | <0.0001 |
|---|---|---|---|---|---|
| $SO_4$ | 0.04 | Al | <0.0001 | As | 0.0004 |
| $C_{org}$ | 0.05 | Mg | <0.0001 | V | 0.0001 |
| F | 0.01 | Zn | <0.0001 | Cd | <0.0001 |

The aqueous phase (1218 g/h) obtained during the extraction contained 393.4 g/h $P_2O_5$. This corresponded to 48.5% of the crude $P_2O_5$; in other words, the yield was 51.5%. The raffinate acid was composed as follows (weight %):

| $P_2O_5$ | 32.3 | Fe | 0.36 | Cr | 0.016 |
|---|---|---|---|---|---|
| $SO_4$ | 0.17 | Al | 0.15 | As | 0.0002 |
| F | 0.3 | Mg | 0.92 | V | not identified |
| Amyl alcohol | 0.3 | Zn | 0.033 | Cd | 0.0018 |

This acid was introduced into the head end portion of a packed column, freed from dissolved and suspended alcohol by the introduction of steam into the base of the column, the composition of the acid and its $P_2O_5$-content remaining practically unchanged.

1200 g of the stripped raffinate acid was neutralized at 70° C. with 825 g sodium hydroxide solution (50% strength) until establishment of a pH value of 8.4. The whole was stirred for 30 minutes, filtered at 80° C. and the filter cake was scrubbed three times, each time with 90 ml hot water. The filtrate and scrubbing water were united and 1762 g disodium phosphate solution of the following composition was obtained:

| $P_2O_5$ | 18.7 | Fe | 0.0003 | Cr | <0.0001 |
|---|---|---|---|---|---|
| $SO_4$ | 0.2 | Al | <0.0050 | As | 0.0001 |
| F | 0.0029 | Mg | 0.023 | V | 0.0003 |
| $C_{org}$ | 0.0090 | Zn | 0.0024 | Cd | 0.0001 |

444 g filter cake was also obtained.

1 kg of this neutralization sludge (from several experiments) containing about 45% adhering water and water of crystallization was mixed with 4 kg ground phosphate ore, water was sprayed thereonto and the whole converted to granules in a rotating drum. After drying and sintering at about 950° C., the granules had an abrasion resistance of more than 90% which made them suitable for use in a phosphorus furnace.

We claim:
1. A splitting process for purifying crude wet-process phosphoric acid containing a 45–54 weight % $P_2O_5$ content, consisting essentially of the steps:
   (a) contacting the feed wet-process phosphoric acid with an organic solvent which is immiscible or only partially miscible with water and is capable of dissolving phosphoric acid so at most 40 to 70 weight % of the $P_2O_5$ content of the feed wet-process phosphoric acid is extracted by mixing the organic solvent with the said acid in a ratio by vol- ume of more than 4:1 in a single process step, with the resulting formation of a plurality of phases between which the said $P_2O_5$ content is split:

an organic extract phase containing at most 40 to 70 weight % of said $P_2O_5$ content, and an aqueous raffinate phase containing essentially the remaining phosphoric acid residue, the concentration of $P_2O_5$ in said aqueous raffinate phase being at most 28–32 weight % $P_2O_5$, and separating subsequently the organic extract phase from the aqueous raffinate phase;

(b) scrubbing the separated organic extract phase with a quantity of an aqueous medium corresponding to at most 5% of the volume of the phosphoric acid extract; recycling the scrubbing solution formed into stage (a); recovering from the scrubbed phosphoric acid extract either purified phosphoric acid by reextracting the extract with water or recovering a purified alkali metal phosphate solution by reextracting the extract with an alkaline solution;

(c) neutralizing the said aqueous raffinate phase produced in step (a) by subjecting it to treatment with an alkaline agent with the resultant formation of a further purified alkali metal phosphate solution and with precipitation of a so-called neutralization sludge, and (d) separating said neutralization sludge and alkali metal phosphate solution from one another, mixing the sludge with finely ground phosphate ore, and converting the mixture into phosphate pellets for use in electrothermal phosphorus production.

2. The process as claimed in claim 1, wherein wet-process phosphoric acid is extracted to such an extent that the remaining aqueous phosphoric acid residue in said aqueous raffinate phase has a concentration of 30–32 weight % $P_2O_5$.

3. The process as claimed in claim 1, wherein, in said step (a), the organic solvent is mixed with the wet-process phosphoric acid in a ratio by volume of 6:1 to 10:1.

4. The process as claimed in claim 1, wherein, in said step (b), the separated organic extract phase is scrubbed with a quantity of the aqueous medium corresponding to 3.3–2% of the volume of the organic extract phase.

5. The process as claimed in claim 1, wherein, in said step (a), the feed wet-process phosphoric acid is mixed with the organic solvent so that 50–55 weight % of the $P_2O_5$ content is extracted into the resulting organic extract phase.

* * * * *